Patented Nov. 23, 1926.

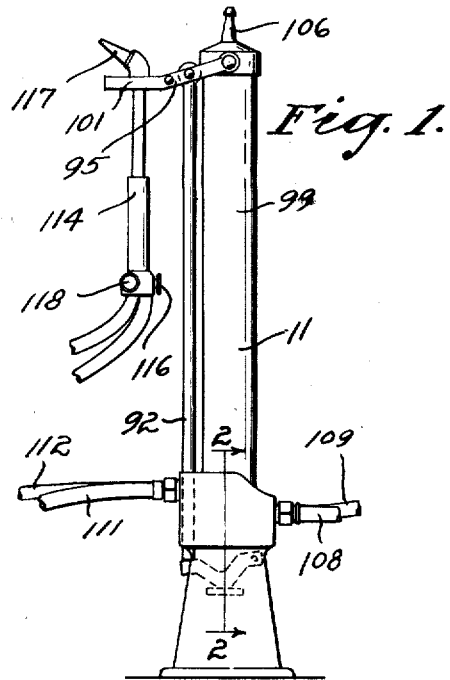
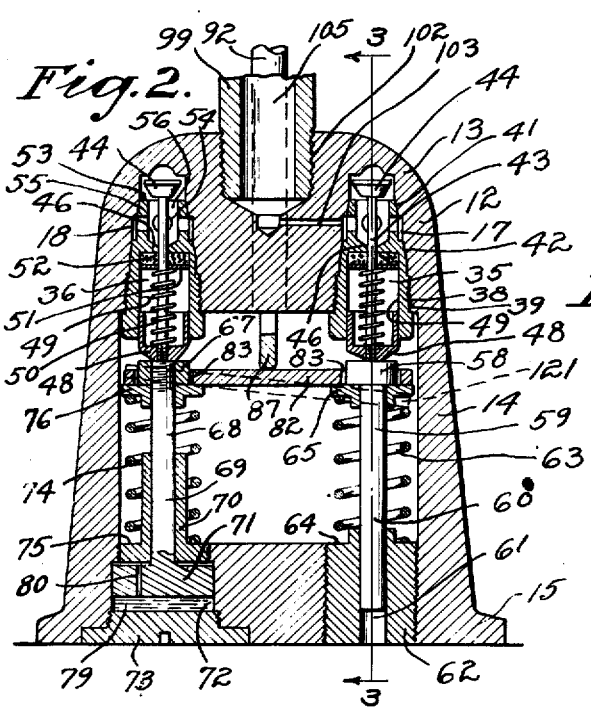
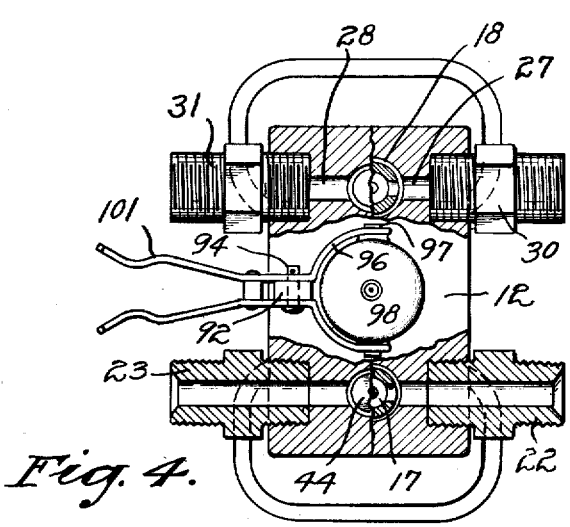
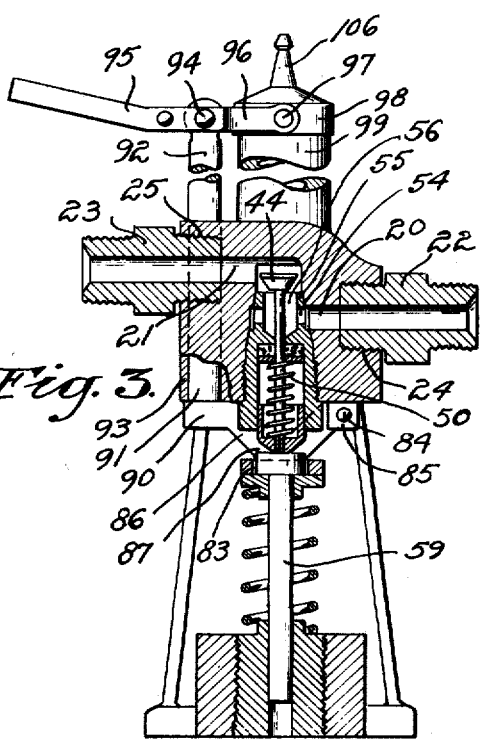

1,607,816

UNITED STATES PATENT OFFICE.

CLARENCE J. COBERLY, OF LOS ANGELES, CALIFORNIA, ASSIGNOR TO PUROX COMPANY, OF DENVER, COLORADO, A CORPORATION OF COLORADO.

AUTOMATIC REGULATING VALVE.

Application filed January 22, 1925. Serial No. 3,955.

This invention relates to autogenous welding apparatus, and it relates particularly to an automatic shut-off valve arrangement designed for employment in combination with welding equipment.

Autogenous welding is practiced extensively with oxyacetylene welding equipment. A welding torch is supplied with combustible gases through hose which extend from suitable gas supplies. The torch has a mixing chamber wherein the combustible gases are mixed and has a tip through which the mixed gases are ejected. In lighting a torch of this character, the acetylene gas valve of the torch is opened first, and the torch lit, whereafter the oxygen valve is opened to supply a required amount of oxygen gas to obtain a proper flame. It is desirable to open the acetylene valve first, due to the fact that the flame may be much more easily lit than if the gases were simultaneously turned on, or if the oxygen were turned on first. When shutting off the torch, the acetylene gas is shut off first, whereafter the oxygen gas is shut off. This prevents a back-firing and prevents a burning out of the tip. It is found that when the oxygen gas is turned off prior to the acetylene gas, the torch tends to back-fire, and the acetylene gas will light inside the tip of the torch, thus overheating and burning the tip.

It is an object of my invention to provide a novel valve construction in which the acetylene gas will be turned on prior to the oxygen gas, and will be turned off prior to the oxygen gas, this action being automatic. I provide my invention in the form of a body having an oxygen passage and an acetylene passage therethrough, these passages being closed by an oxygen valve and an acetylene valve, respectively. The valves are normally held in closed positions and plungers are provided for unseating these valves. A balance plate is associated with the plungers, and an arm is associated with the balance plate in such a manner that an actuation thereof operates the balance plate in such a manner as to operate the plungers so as to open or close the oxygen and acetylene valves. The oxygen valve is provided with a brake means for retarding the operation thereof. When the arm is operated for opening the valve, the balance plate operates the plungers, the acetylene plunger being unrestrained rapidly unseats the acetylene valve, whereas the oxygen plunger being retarded by the brake means does not open the oxygen valve as quickly. In this manner the acetylene valve is opened previous to the oxygen valve. Also, when the arm is operated to close the valve, the balance plate is moved in such a manner as to operate the plungers. The acetylene plunger quickly operates to close the acetylene valve whereas the oxygen plunger does not operate so quickly and does not close the oxygen valve until the acetylene valve is already closed.

It is another object of my invention to provide in a construction of the character described, a pilot light whereby a torch may be conveniently lighted. The arm of the construction is arranged to be operated by an actuator rod which pivots to a torch hook. When the torch is in operation, it is placed on the hook, this swinging the hook and causing the actuator to move the arm in such a manner as to close the oxygen and acetylene valves; therefore, when the torch is not in use, it is hung on the hook and the gases are automatically shut off. When the torch is to be used again, it is removed from the hook, this automatically operating the balance plate to operate the plungers. The acetylene valve immediately opens, supplying acetylene gas to the torch. This torch is then lit by means of the pilot and shortly thereafter the oxygen valve is opened and oxygen is supplied to the torch, thus giving the torch a proper mixture for a welding flame. This arrangement is very convenient and advantageous in a number of respects. For example, the shut-off valves of the torch are first regulated to supply the proper proportions of gases to the tip after which it is unnecessary to touch these valves, owing to the fact that the gas supply is shut off by the automatic valve when the torch is hung on the hook.

At the present time, every time the torch is shut down, it is necessary to shut the torch valves, and every time the torch is brought into use, it is necessary to open the valves and to adjust the flame. By the employment of my invention, each time the torch is shut off and brought into use, this individual adjustment is eliminated, it being only necessary to adjust the valves when the torch is first put into use. In practice it is necessary to shut off and relight the torch quite frequently and an arrangement of this character saves considerable time and labor by eliminating an adjustment of the valves at each relighting of the torch. Provision of the pilot light also saves time for the workmen.

Other objects and advantages of the invention will be made evident hereinafter.

Referring to the drawing which is for illustrative purposes only,

Fig. 1 is a side elevational view of a valve construction embodying the features of my invention.

Fig. 2 is an enlarged vertical sectional view taken through the body of the construction shown in Fig. 1, this view being taken substantially on the line 2—2 of Fig. 1.

Fig. 3 is a section taken substantially as indicated by the line 3—3 of Fig. 2.

Fig. 4 is a plan view of the valve construction, this view being partially sectioned.

With reference to the drawings, a valve construction 11 of my invention has a body 12 comprising a head 13 supported by legs 14 from a base 15. In the head 13 is provided an acetylene valve chamber 17 and an oxygen valve chamber 18. An acetylene inlet 20 connects with the acetylene valve chamber at an intermediate point and an acetylene outlet 21 connects with the chamber 17 at an upper end thereof. Connectors 22 and 23 are threaded into threaded enlargements 24 and 25 of the inlet and outlet 20 and 21, respectively. An oxygen inlet 27 connects with the oxygen valve chamber 18 at an intermediate point and an oxygen outlet 28 connects with the chamber 18 at the extreme upper end thereof. Connectors 30 and 31 are secured to the body 12 so as to be in communication with the oxygen inlet and outlet 27 and 28.

In the acetylene valve chamber 17 is an acetylene valve construction 35 and in the oxygen valve chamber 18 is an oxygen valve construction 36. The valve constructions 35 and 36 are identical. Each of these constructions comprises a cage 38 which is extended into either of the chambers 17 or 18, each of these cages having a threaded portion 39 and conical faces 41 and 42 which coengage with complementary faces of either of the valve chambers, thus providing gas-tight seals therebetween. A valve stem 43 having a head 44 formed at the upper end thereof extends through a radial wall 46 of each of the cages 38. At the lower end of each of the stems 43 is attached a cap 48 which is movable in a cylindrical cavity 49 of each of the cages 38. A spring 50, compressing packing 52, is compressed between a disc 51 and the cap 48 of each of the constructions 35 and 36. The springs 50 normally seat the heads 44 on seats 53 formed at the upper ends of cylindrical projections 55 of each of the cages 38. Orifices 54 are provided in the cylindrical projection 55 of each of the cages 38 for communicating an interior 56 of each of the cylindrical projections 55 with the inlet passage of either of the chambers 17 or 18. The springs 50 seat the valves 44 and at this time there will be no flow of gas from either of the outlets 21 or 28.

A head 58 of the plunger 59 is adapted to engage the lower face of the cap 48 of the acetylene valve construction 35. The lower end of a stem 60 of this plunger 59 extends into an opening 61 in a plug 62. This plug 62 is threaded as clearly shown in Figs. 2 and 3 into the base portion 15 of the body 12. A spring 63 is compressed between an upper face 64 of the plug 62 and a plate 65 which is forced into engagement with the head 58 by reason of the spring 63.

A head 67 of a plunger 68 is arranged to engage with the lower end of the cap 48 of the oxygen valve construction 36. A stem 69 of the plunger 68 extends downwardly through a sleeve 70 and has a piston 71 formed at the lower end thereof, this piston 71 resting in a cylinder 72. A spring 74 is compressed between a face 75 of the sleeve 70 and a plate 76 which is forced into engagement with the lower face of the head 67 by this spring 74. The lower end of the cylinder 72 is closed by a plug 73 which admits the installation of the plunger 68. The head 67 is a separate part which is installed in place after the stem 69 of the plunger 68 has been extended through the sleeve 70.

The springs 63 and 74 are adapted to resiliently force and retain the plungers 59 and 68 in an upper position. The space in the cylinder 72 not occupied by the piston 71, is filled with a liquid such as glycerine as indicated at 79. When the plunger 68 is forced downwardly, glycerine flows through a by-pass 80 from the space below the piston 71 to the space above the piston 71.

A balance plate 82 has openings 83 near the ends thereof through which there extend the heads 58 and 67, which balance plate 82 rests on the upper faces of the plates 65 and 76. Pivoted by a pin 84 between lugs 85 which extend from the head 13 is a pivoted arm 86 which is bowed at 87 and which is adapted to engage the balance plate 82 at a central point. The forward end 90 of the pivoted arm 86 is adapted to be engaged by a lower end 91 of an actuator rod 92 which extends through an opening 93 in the forward and central part of the head 13 of the body 12. The actuator rod 92 extends upwardly and pivots at 94 to a hook 95. The hook 95 is clevised at 96 so as to extend to each side of and pivot by pins 97 to a head 98 of a tubular member 99. The extending end of the hook 95 is provided in the form of a pair of extending legs 101. The tubular member 99 threads into a cavity 102, which cavity 102 is in communication with the acetylene valve chamber 17 below the valve head 44 thereof by means of a passage 103 formed in the head 13. This arrangement supplies acetylene gas at all times to the cavity 102 and to the interior 105 of the tube 99. The head 98 is provided with a jet 106 from which a small stream of acetylene gas flows at all times, this stream being lighted in order to provide a pilot light.

Attached to the connectors 22 and 30 are acetylene and oxygen hose 108 and 109, respectively, which supply gas to the construction 11. Attached to the outlet connectors 23 and 31 are acetylene and oxygen hose 111 and 112, respectively. These hose extend and connect to a torch 114 which is, as shown in Fig. 1, hung on the legs 101 of the hook 95. When the torch 114 is hung on the hook 95, this hook swings into depressed position, swinging from the position shown in Fig. 3 into a position shown in Fig. 1. This moves the actuator rod 92 downwardly in a manner to depress the pivoted arm 86, thus forcing the balance plate 82 downwardly so as to remove the plungers 59 and 68 from engagement with the caps 48, thus closing the valves of the valve constructions 35 and 36. This prevents a flow of gas to the torch 114. When the torch 114 is removed from the hook 95, the parts move into raised position as shown in Figs. 2, 3 and 4, allowing the plungers to remove the heads 44 from their seats 53 by action of the springs 63 and 74, which move the plungers 59 and 68 into upper position and into engagement with the caps 48 of the constructions 35 and 36.

As previously mentioned, it is desirable when lighting the torch to have a flow of acetylene prior to a flow of oxygen, and in shutting down the torch to shut off the flow of acetylene prior to the flow of oxygen. When first putting the torch into operation, it is removed from the hook 95, thus supplying gases thereto. An acetylene valve 116 of the torch is opened and a flow of acetylene egresses from a tip 117 of the torch 114 which is lighted by a flame from the pilot light. An oxygen valve 118 is then opened to permit a flow of the proper amount of oxygen through the tip 117.

When it is necessary to shut down the torch, it is not necessary to shut off either the valves 116 or 118, but the torch 114 is hung on the hook 95. This causes the portion 87 of the arm 86 to force the balance plate 82 downwardly.

Due to the provision of the dash-pot brake arrangement of the plunger 68, the response of this plunger to the force of the balance plate 82 is somewhat sluggish, whereas a response of the plunger 59 is active; therefore, when the plate 82 is engaged by the arm 86, the pressure transferred to the plunger 59 thereby immediately results in a depression of this plunger 59, whereas the pressure applied by the plate 82 to the plunger 68 does not immediately depress this plunger. Upon a depression of the pivoted arm 86 the plate 82 tends to immediately depress the plunger 59 and assumes substantially the position indicated by the dotted lines 121 of Fig. 2. This immediate action of the plunger 59 allows the spring 50 to seat the valve head 44 of the valve construction 35, thus preventing a flow of acetylene to the torch 114. The pressure of the plate 82 against the plunger 68 gradually forces liquid 79 through the by-pass 80 into a space of the cylinder 72 above the piston 71, and the plunger 68 gradually moves into depressed position and gradually allows the valve head 44 of the oxygen valve construction 36 to close, thus shutting off the flow of oxygen to the torch 114. This automatically accomplishes a shutting off of the acetylene previous to the shutting off of the oxygen as is now accomplished manually.

When it is desired to use the torch, it is removed from the hook 95. The action of the springs 63 and 74 tend to turn the balance plate 82 into upper position as shown in Figs. 2 and 3 of the drawing. This forces the pivoted arm 86 and the actuator rod 92 and the hook 95 into elevated position. The plunger 59 by reason of the spring 63 quickly moves into elevated position, thus immediately opening the acetylene valve and allowing a flow of acetylene to the torch 114. The acetylene gas flowing from the tip 117 is lit by the pilot 106. The pressure of the spring 74 gradually forces the liquid in the cylinder 72 from a space above the piston 71 through the by-pass 80 to a space below the piston created by an upward movement of the plunger 68. For this reason, the plunger 68 will slowly move into elevated position and will gradually open the oxygen to the torch 114. The proper amount of acetylene and oxygen will be supplied to the tip 117 due to the fact that the shut-off valves 116 and 118 of the torch have been previously set. This saves considerable time as it is not necessary at each individual use of the torch to readjust these valves 116 and 118.

The valve construction of my invention is automatic in operation and will, as previously described, open the acetylene valve previous to the oxygen valve and close the acetylene valve previous to the oxygen valve as is necessary to a proper operating of a welding torch. The construction provides a convenient hanger for the torch when it is not in operation, and the actuating arrangement provides a novel means for shutting off the flow of gases to the torch at such times as it is not in use, that is, when the torch is hung on the hook 95. A pilot light 106 is also handy, as it adds to the convenience in the lighting of the torch.

I claim as my invention:

1. In a construction of the class described, the combination of: a body having a pair of gas passages therethrough; a valve for obstructing each of said passages; automatic means for opening said valves; manually operated means for releasing said valve opening means; and brake means for retarding the opening of one valve to permit the other valve to open first.

2. In a construction of the class described, the combination of: a body having a pair of gas passages therethrough; a valve for obstructing each of said passages; and automatic means for operating said valves at relatively different speeds so that one of said valves will open and close an appreciable period of time previous to the other, both of said valves being completely open intermediate the opening and the closing operations.

3. In a construction of the class described, the combination of: a body having a pair of gas passages therethrough; a valve for obstructing each of said passages; and means for operating said valves at relatively different speeds so that one of said valves will close previous to the other.

4. In a construction of the class described, the combination of: a body having a pair of gas passages therethrough; a valve for obstructing each of said passages; a plunger for each of said valves whereby said valves are operated; means for operating said plungers so as to open and close said valves; and means for retarding the speed of actuation of one of said plungers relative to the other so that one of said valves will open and close previous to the other, both of said valves being completely open intermediate the opening and the closing operations.

5. In a construction of the class described, the combination of: a body having a pair of gas passages therethrough; a valve for obstructing each of said passages; a plunger for each of said valves whereby said valves are operated; a balance plate whereby said plungers are operated; an arm for moving said balance plate; means for actuating said arm; and means for retarding the actuation of one of said plungers so that one of said valves will open and close previous to the other.

6. In a construction of the class described, the combination of: a body having a pair of gas passages therethrough; a valve for obstructing each of said passages; a plunger for each of said valves whereby said valves are operated; means for operating said plungers so as to open and close said valves; and a dash-pot for retarding the actuation of one of said plungers so that one of said valves will open and close previous to the other.

7. In a construction of the class described, the combination of: a body having a pair of gas passages therethrough; a valve for obstructing each of said passages; a plunger for each of said valves whereby said valves are operated; a balance plate whereby said plungers are operated; an arm for moving said balance plate; means for actuating said arm; and a dash-pot for retarding the actuation of one of said plungers so that one of said valves will open and close previous to the other.

8. In a construction of the class described, the combination of: a body having a pair of gas passages therethrough; a valve for obstructing each of said passages; a plunger for each of said valves whereby said valves are operated; a balance plate whereby said plungers are operated; a pivoted lever for operating said balance plate; an actuator rod reciprocally mounted externally of said body for operating said pivoted lever so as to operate said plungers; a hook pivoted externally to the upper end of said body for operating said actuator rod; and means for retarding the actuation of one of said plungers so that one of said valves will open and close previous to the other.

In testimony whereof, I have hereunto set my hand at Los Angeles, California, this 16th day of January, 1925.

CLARENCE J. COBERLY.

torch is hung on the hook 95. A pilot light 106 is also handy, as it adds to the convenience in the lighting of the torch.

I claim as my invention:

1. In a construction of the class described, the combination of: a body having a pair of gas passages therethrough; a valve for obstructing each of said passages; automatic means for opening said valves; manually operated means for releasing said valve opening means; and brake means for retarding the opening of one valve to permit the other valve to open first.

2. In a construction of the class described, the combination of: a body having a pair of gas passages therethrough; a valve for obstructing each of said passages; and automatic means for operating said valves at relatively different speeds so that one of said valves will open and close an appreciable period of time previous to the other, both of said valves being completely open intermediate the opening and the closing operations.

3. In a construction of the class described, the combination of: a body having a pair of gas passages therethrough; a valve for obstructing each of said passages; and means for operating said valves at relatively different speeds so that one of said valves will close previous to the other.

4. In a construction of the class described, the combination of: a body having a pair of gas passages therethrough; a valve for obstructing each of said passages; a plunger for each of said valves whereby said valves are operated; means for operating said plungers so as to open and close said valves; and means for retarding the speed of actuation of one of said plungers relative to the other so that one of said valves will open and close previous to the other, both of said valves being completely open intermediate the opening and the closing operations.

5. In a construction of the class described, the combination of: a body having a pair of gas passages therethrough; a valve for obstructing each of said passages; a plunger for each of said valves whereby said valves are operated; a balance plate whereby said plungers are operated; an arm for moving said balance plate; means for actuating said arm; and means for retarding the actuation of one of said plungers so that one of said valves will open and close previous to the other.

6. In a construction of the class described, the combination of: a body having a pair of gas passages therethrough; a valve for obstructing each of said passages; a plunger for each of said valves whereby said valves are operated; means for operating said plungers so as to open and close said valves; and a dash-pot for retarding the actuation of one of said plungers so that one of said valves will open and close previous to the other.

7. In a construction of the class described, the combination of: a body having a pair of gas passages therethrough; a valve for obstructing each of said passages; a plunger for each of said valves whereby said valves are operated; a balance plate whereby said plungers are operated; an arm for moving said balance plate; means for actuating said arm; and a dash-pot for retarding the actuation of one of said plungers so that one of said valves will open and close previous to the other.

8. In a construction of the class described, the combination of: a body having a pair of gas passages therethrough; a valve for obstructing each of said passages; a plunger for each of said valves whereby said valves are operated; a balance plate whereby said plungers are operated; a pivoted lever for operating said balance plate; an actuator rod reciprocally mounted externally of said body for operating said pivoted lever so as to operate said plungers; a hook pivoted externally to the upper end of said body for operating said actuator rod; and means for retarding the actuation of one of said plungers so that one of said valves will open and close previous to the other.

In testimony whereof, I have hereunto set my hand at Los Angeles, California, this 16th day of January, 1925.

CLARENCE J. COBERLY.

---

Certificate of Correction.

It is hereby certified that in Letters Patent No. 1,607,816, granted November 23, 1926, upon the application of Clarence J. Coberly, of Los Angeles, California, for an improvement in "Automatic Regulating Valves," an error appears requiring correction as follows: Page 4, lines 20 and 21, claim 2, strike out the words "an appreciable period of time"; and that the said Letters Patent should be read with this correction therein that the same may conform to the record of the case in the Patent Office.

Signed and sealed this 28th day of December, A. D. 1926.

[SEAL.]

M. J. MOORE,
*Acting Commissioner of Patents.*

Certificate of Correction.

It is hereby certified that in Letters Patent No. 1,607,816, granted November 23, 1926, upon the application of Clarence J. Coberly, of Los Angeles, California, for an improvement in "Automatic Regulating Valves," an error appears requiring correction as follows: Page 4, lines 20 and 21, claim 2, strike out the words " an appreciable period of time "; and that the said Letters Patent should be read with this correction therein that the same may conform to the record of the case in the Patent Office.

Signed and sealed this 28th day of December, A. D. 1926.

[SEAL.]

M. J. MOORE,
*Acting Commissioner of Patents.*